(12) United States Patent
Hinrichs (10) Patent No.: US 8,029,039 B2
(45) Date of Patent: Oct. 4, 2011

(54) ROOF LOCKING APPARATUS FOR A VEHICLE

(75) Inventor: Frank Hinrichs, Hiroshima (JP)

(73) Assignee: Webasto AG (DE)

( * ) Notice: Subject to any disclaimer, the term of this patent is extended or adjusted under 35 U.S.C. 154(b) by 155 days.

(21) Appl. No.: 12/294,951

(22) PCT Filed: Mar. 28, 2007

(86) PCT No.: PCT/JP2007/056637
§ 371 (c)(1),
(2), (4) Date: Dec. 10, 2008

(87) PCT Pub. No.: WO2007/114163
PCT Pub. Date: Oct. 11, 2007

(65) Prior Publication Data
US 2010/0164255 A1    Jul. 1, 2010

(30) Foreign Application Priority Data

Mar. 28, 2006   (JP) ................................ 2006-088252

(51) Int. Cl.
*B60J 7/00*   (2006.01)
(52) U.S. Cl. ....................................... 296/121; 296/128
(58) Field of Classification Search .................. 296/121, 296/128
See application file for complete search history.

(56) References Cited

U.S. PATENT DOCUMENTS

| 5,533,777 A | 7/1996 | Kleemann et al. |
| 5,678,881 A * | 10/1997 | Tokarz .......................... 296/121 |
| 6,033,008 A * | 3/2000 | Mattila ..................... 296/107.17 |
| 6,935,675 B2 * | 8/2005 | Kubota et al. ................. 296/121 |
| 2001/0028177 A1 | 10/2001 | Okada et al. |
| 2004/0262943 A1 | 12/2004 | Kubota et al. |

FOREIGN PATENT DOCUMENTS

| DE | 100 39 682 A1 | 3/2002 |
| DE | 103 13 496 A1 | 10/2004 |
| DE | 10 2007 015 706 A1 | 10/2008 |
| EP | 0 649 765 A1 | 4/1995 |
| EP | 1595729 | 11/2005 |
| JP | 5-32057 A | 4/1993 |
| JP | 2001-241242 | 9/2001 |
| JP | 2002-264658 | 9/2002 |
| JP | 2005-22449 | 1/2005 |
| WO | 2005 084982 A1 | 9/2005 |

OTHER PUBLICATIONS

Extended European Search Report dated Dec. 21, 2009; Application No./ Patent No. 07740075.2-2423/ 2006143 PCT/JP2007056637.
International Search Report for PCT/JP2007/056637 dated Jun. 25, 2007.

* cited by examiner

*Primary Examiner* — Joseph Pape
(74) *Attorney, Agent, or Firm* — Studebaker & Brackett PC; Donald R. Studebaker (57) ABSTRACT

A roof locking apparatus for a vehicle (70) is provided in a vehicle body and operable to hold a middle portion with respect to a vehicle width direction of a front edge of the roof (2) within a storage space (7).

3 Claims, 11 Drawing Sheets

ROOF LOCKING APPARATUS FOR A VEHICLE

TECHNICAL FIELD

The present invention relates to a roof locking apparatus for a vehicle.

BACKGROUND ART

Conventionally, a roof locking apparatus for a vehicle provided in a vehicle body and holding a front edge of a movable roof in fully closed state has been known (refer to Patent Document 1). The roof locking apparatus for a vehicle includes a pair of roof locking mechanisms, each of which is installed on right and left ends of a front pillar. The pair of roof locking mechanisms is respectively operable to hold the right and left ends of the front edge when the movable roof is in fully closed state. Thus, it is possible to prevent the movable roof from wobbling in fully closed state.

Patent Document: Japanese Unexamined Patent Publication No. 2001-241242

DISCLOSURE OF THE INVENTION

Problems that the Invention is to Solve

As described above, a roof locking apparatus includes two roof locking mechanisms, thus having a number of members. Therefore, conventionally, there has been a need for reduction in the number of members of the roof locking apparatus for a vehicle.

The present invention has been made in light of the above. It is an object of the present invention to provide a roof locking apparatus which can reduce the number of members of the roof locking apparatus.

Means for Solving the Problems

A first invention is a roof locking apparatus for a vehicle provided in a vehicle body and holding a movable roof in a predetermined space, characterized in that it holds a middle portion with respect to a vehicle width direction of one edge of the roof in a front-rear direction within said predetermined space.

Accordingly, as the roof locking apparatus holds the middle portion with respect to the vehicle width direction of the one edge of the roof in the front-rear direction within the predetermined space, the number of members of the apparatus can be reduced, when compared with the case in which the apparatus holds both ends with respect to a vehicle width direction of one edge of the roof in a front-rear direction within a predetermined space.

A second invention is characterized in that in said first invention, said roof is of retractable type that can be retracted into a storage space as said predetermined space, and the roof locking apparatus holds a middle portion with respect to a vehicle width direction of a front edge of the roof within said storage space.

Accordingly, as the roof locking apparatus holds the middle portion with respect to the vehicle width direction of the front edge of the roof within the storage space, it can prevent the roof from oscillating in the storage space.

A third invention is characterized in that in said second invention, said roof has a front roof, a rear roof, and a rear window and the roof locking apparatus holds a middle portion with respect to a vehicle width direction of a front edge of the front roof within said storage space.

Accordingly, as the roof locking apparatus holds the middle portion with respect to the vehicle width direction of the front edge of the front roof within the storage space, it can prevent the front roof from oscillating in the storage space.

A fourth invention is characterized in that in said second or third invention, the roof locking apparatus has a grip member for gripping a middle portion with respect to a vehicle width direction of a front edge of the roof during the roof being retracted into said storage space, and a moving mechanism for moving said grip member between a gripping position where the grip member grips said roof and a holding position at a lower location relative to said gripping position by a predetermined distance therefrom, where said grip member gripping said roof is held, said roof locking apparatus for a vehicle is characterized in that:

to retract said roof into said storage space, after said grip member grips said roof in said gripping position, said moving mechanism moves said grip member gripping the roof from said gripping position to said holding position, where the grip member gripping said roof is held, while on the other hand, to get said roof retracted in said storage space out of the storage space, after said moving mechanism moves the grip member gripping said roof from said holding position to said gripping position, where the roof is then released from the gripped condition by said grip member.

To get a roof retracted in a storage space out of the storage space, there is a possibility that simply by releasing held condition of a front edge of the roof, the roof might tilt forward and move, or bow, due to weight or gravity center of the roof after the release. Then, the bowing may cause the roof to oscillate during movement thereof and be damaged.

Consequently, when a roof retracted in a storage space is gotten out of the storage space, a moving mechanism moves a grip member gripping the front edge of the roof from a holding position to a gripping position defined above the holding position by a predetermined distance therefrom, and then in the gripping position, the front edge of the roof is released from the gripped condition by the grip member. In other words, before the gripped condition of the front edge of the roof by the grip member is released, the front edge of the roof is raised. Thus, when the roof retracted in the storage space is gotten out of the storage space, the roof can be prevented from bowing. Accordingly, when the roof retracted in the storage space is gotten out of the storage space, the roof can be prevented from oscillating during movement thereof and/or being damaged.

A fifth invention is characterized in that in said fourth invention, said moving mechanism has a rail that is provided, in said vehicle body, in a region opposed to a middle portion with respect to a vehicle width direction of a front edge of the roof within said storage space, and that allows said grip member to move in the up-down direction between said gripping position and said holding position.

Consequently, as the rail is provided, in the vehicle body, in the region opposed to the middle portion with respect to the vehicle width direction of the front edge of the roof within said storage space, the grip member can reliably hold the middle portion with respect to the vehicle width direction of the front edge of the roof within the storage space. Thus, oscillation of the roof in the storage space can be reliably prevented.

Effect of the Invention

According to the present invention, as the roof locking apparatus holds a middle portion with respect to a vehicle width direction of one edge of the roof in a front-rear direction within the predetermined space, the number of members of the apparatus can be reduced, when compared with the case in which the apparatus holds both ends with respect to a vehicle width direction of one edge of the roof in the front-rear direction within a predetermined space.

DESCRIPTION OF REFERENCE NUMERALS

1 Road vehicle
2 Front roof
3 Back roof
4 Rear window
5 Retractable roof
6 Lid
7 Storage space
10 Link mechanism (moving mechanism)
70 Roof locking apparatus
71 Hook (grip member)
72 Internal slider (grip member)
73 Slider (grip member)
74 Rail (moving mechanism)
90 Push-pull cable (moving mechanism)

BEST MODE FOR CARRYING OUT THE INVENTION

Embodiments of the present invention will hereinafter be described in detail with reference to the drawings.

Figure 1:
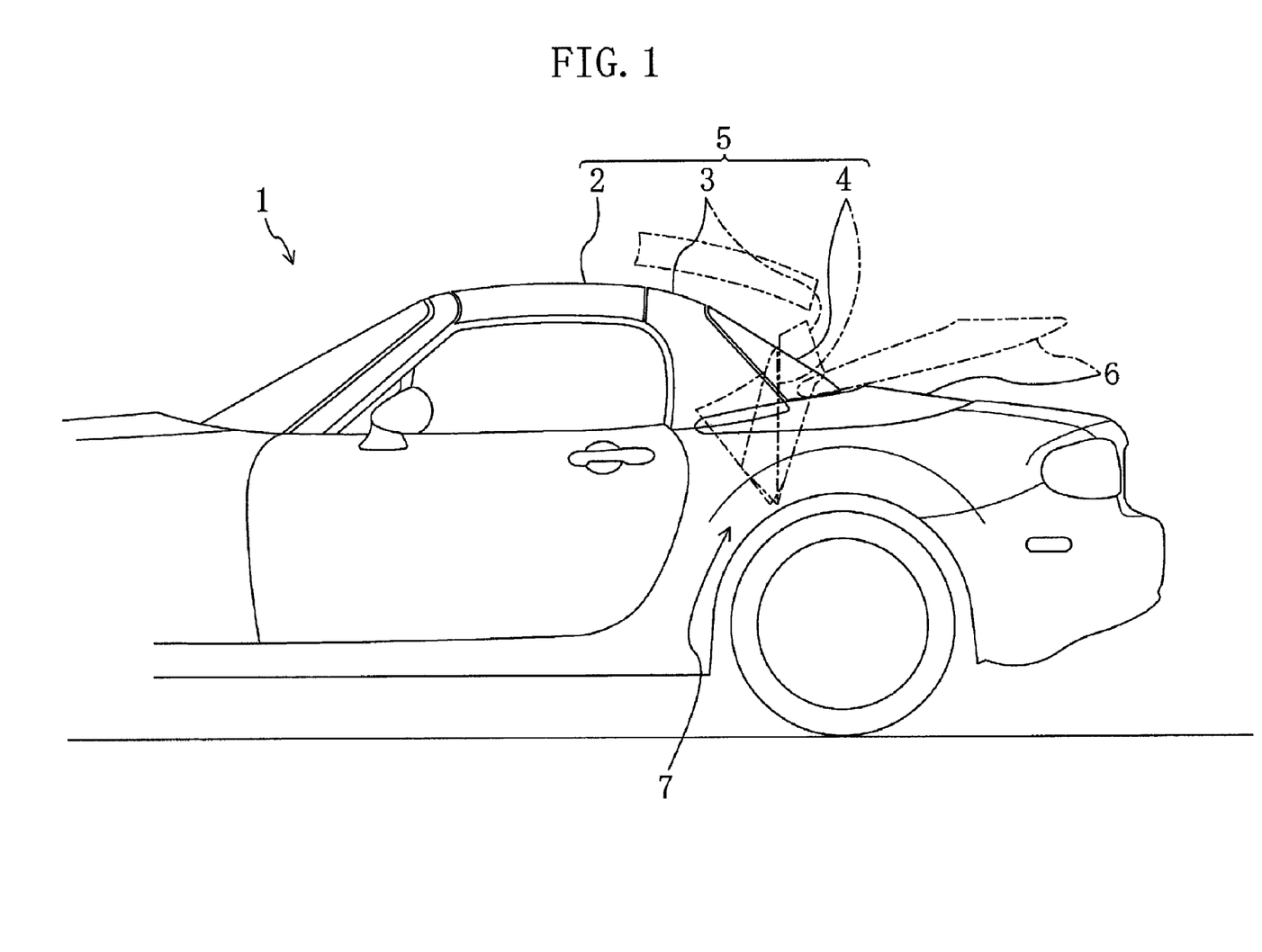
FIG. 1 is a schematic side elevational view showing a road vehicle equipped with a retractable roof according to an embodiment of the present invention.
Figure 2:
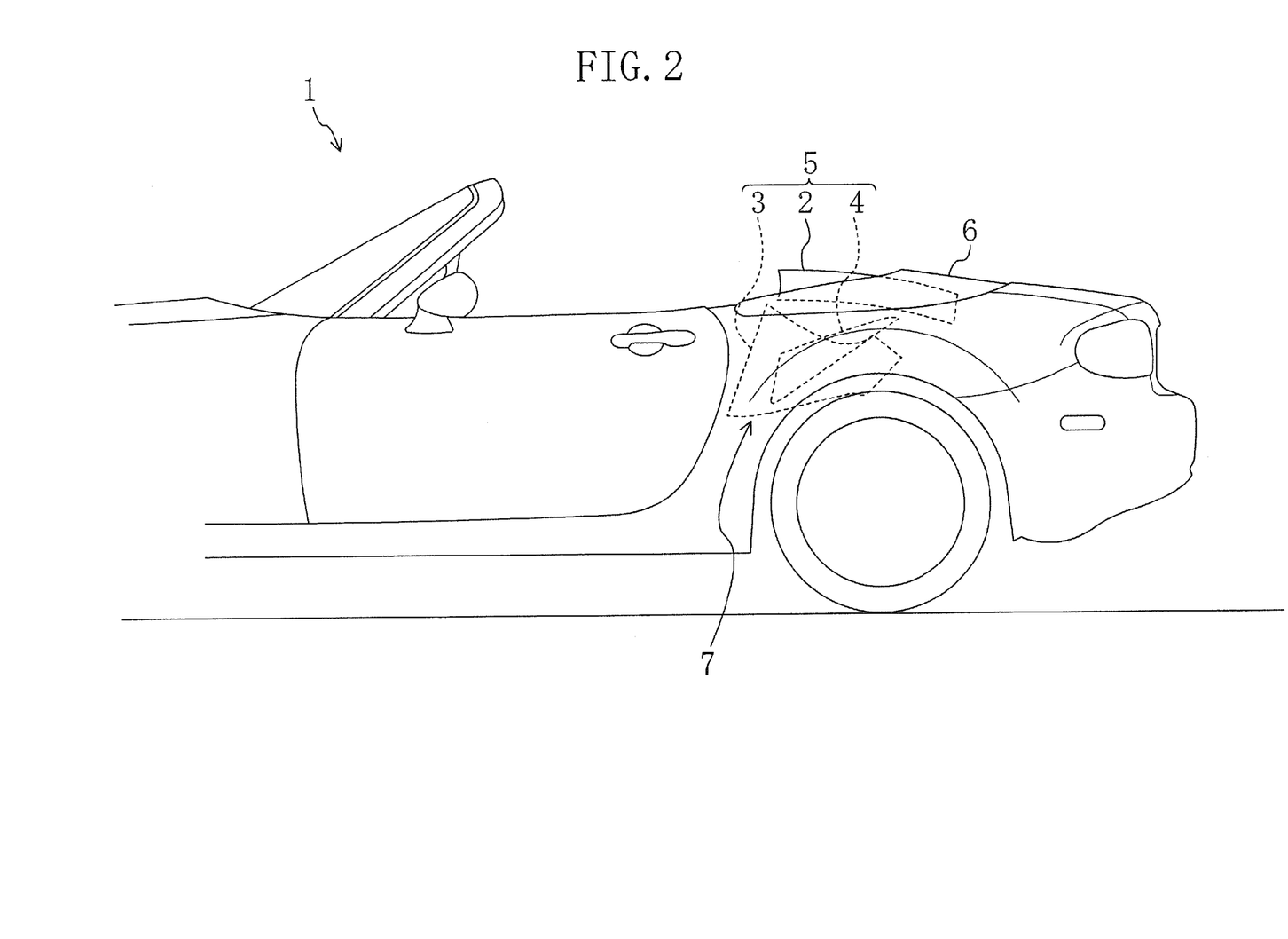
FIG. 2 is a schematic side elevational view of a road vehicle equipped with a retractable roof.
Figure 3:
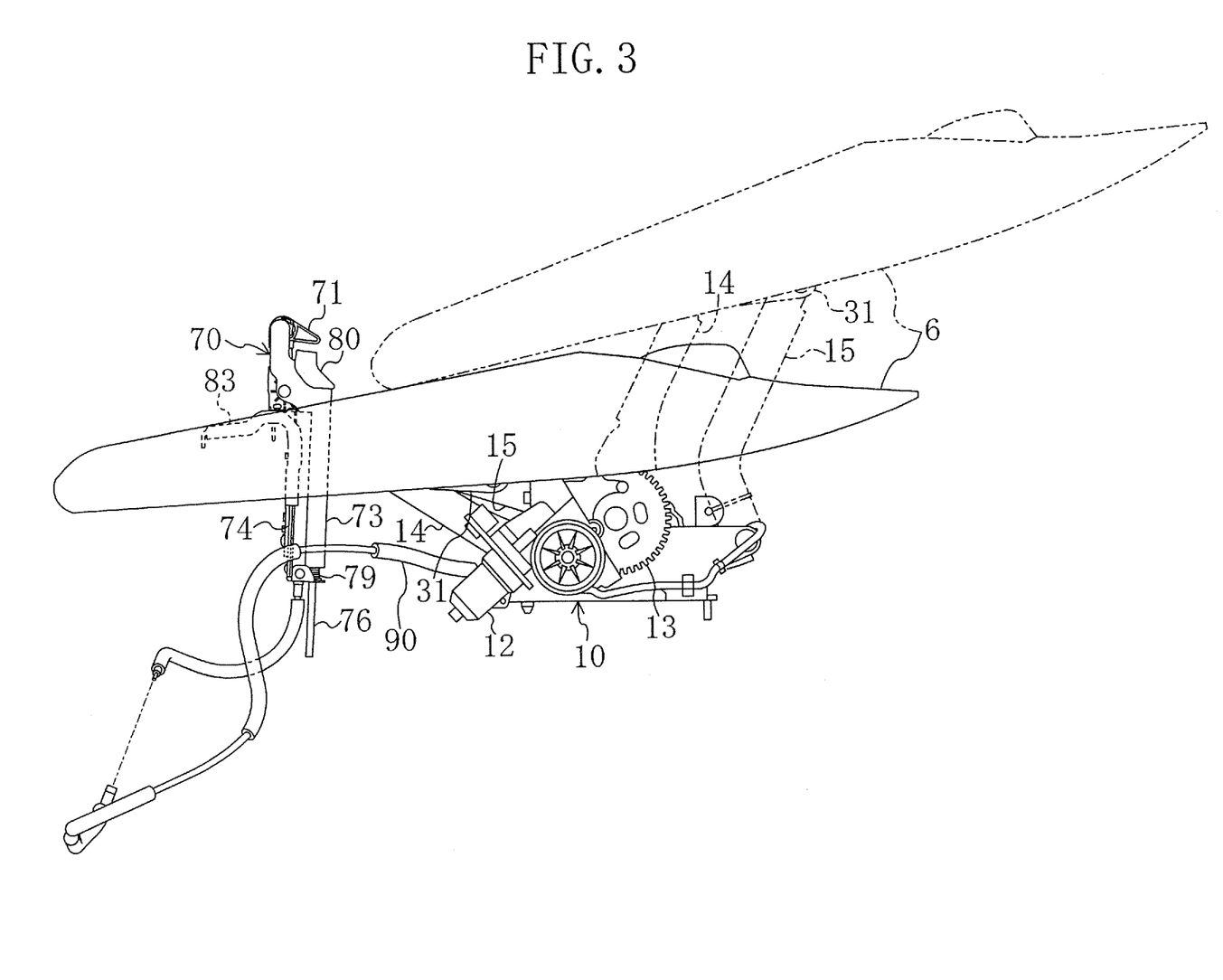
FIG. 3 is a side elevational view of a link mechanism and a roof locking apparatus.
Figure 4:
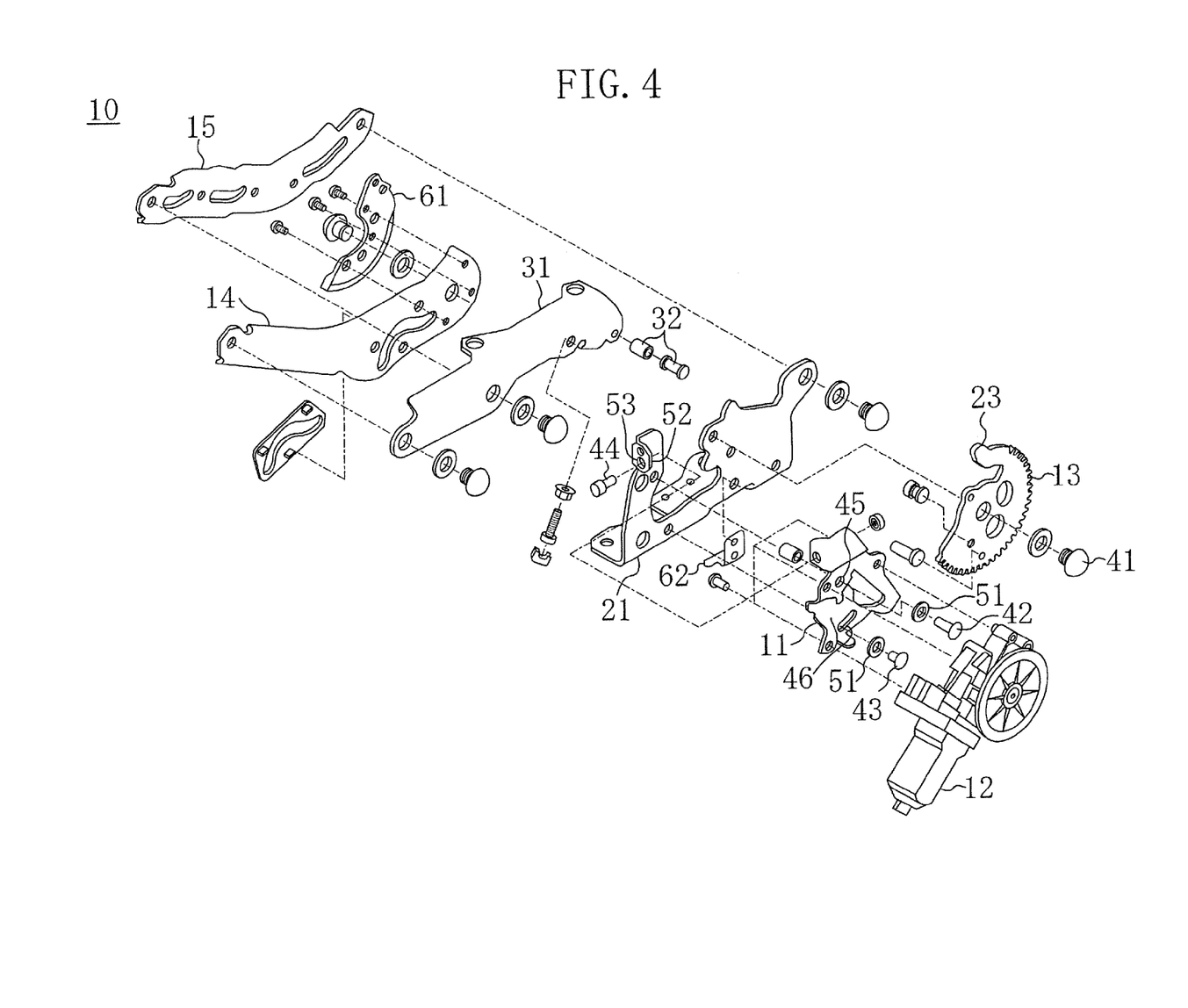
FIG. 4 is an exploded perspective view of a link mechanism.
Figure 5:
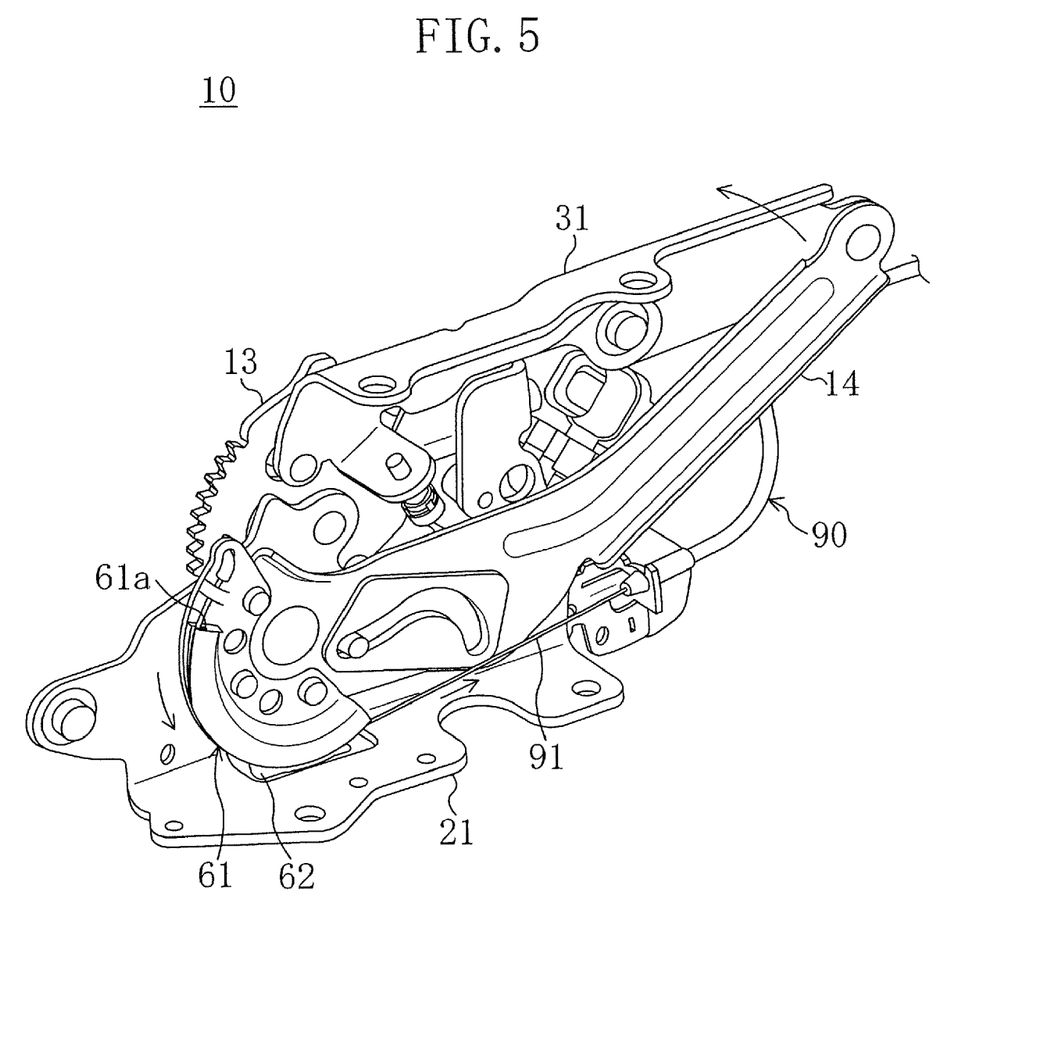
FIG. 5 is a perspective view of a link mechanism with a lid closed, when viewed from the right rear direction relative to a vehicle.
Figure 6:
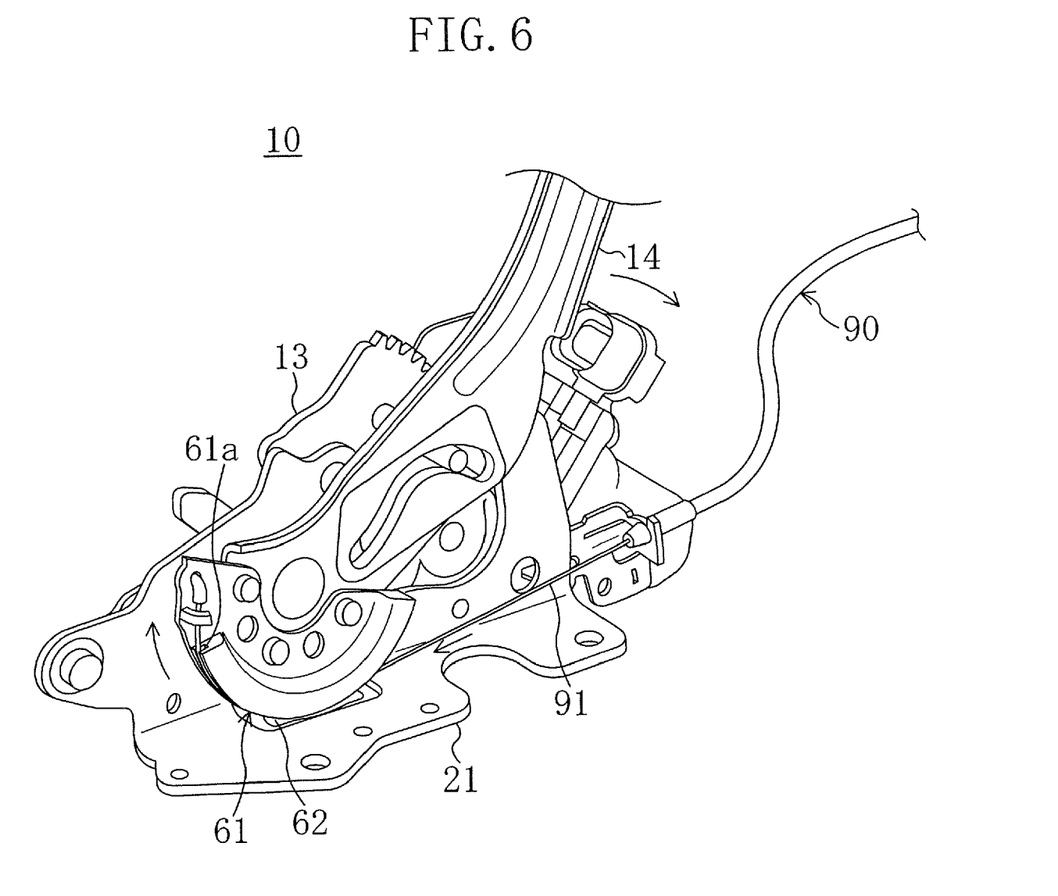
FIG. 6 is a perspective view of a link mechanism with a lid open, when viewed from the right rear direction relative to a vehicle.
Figure 7:
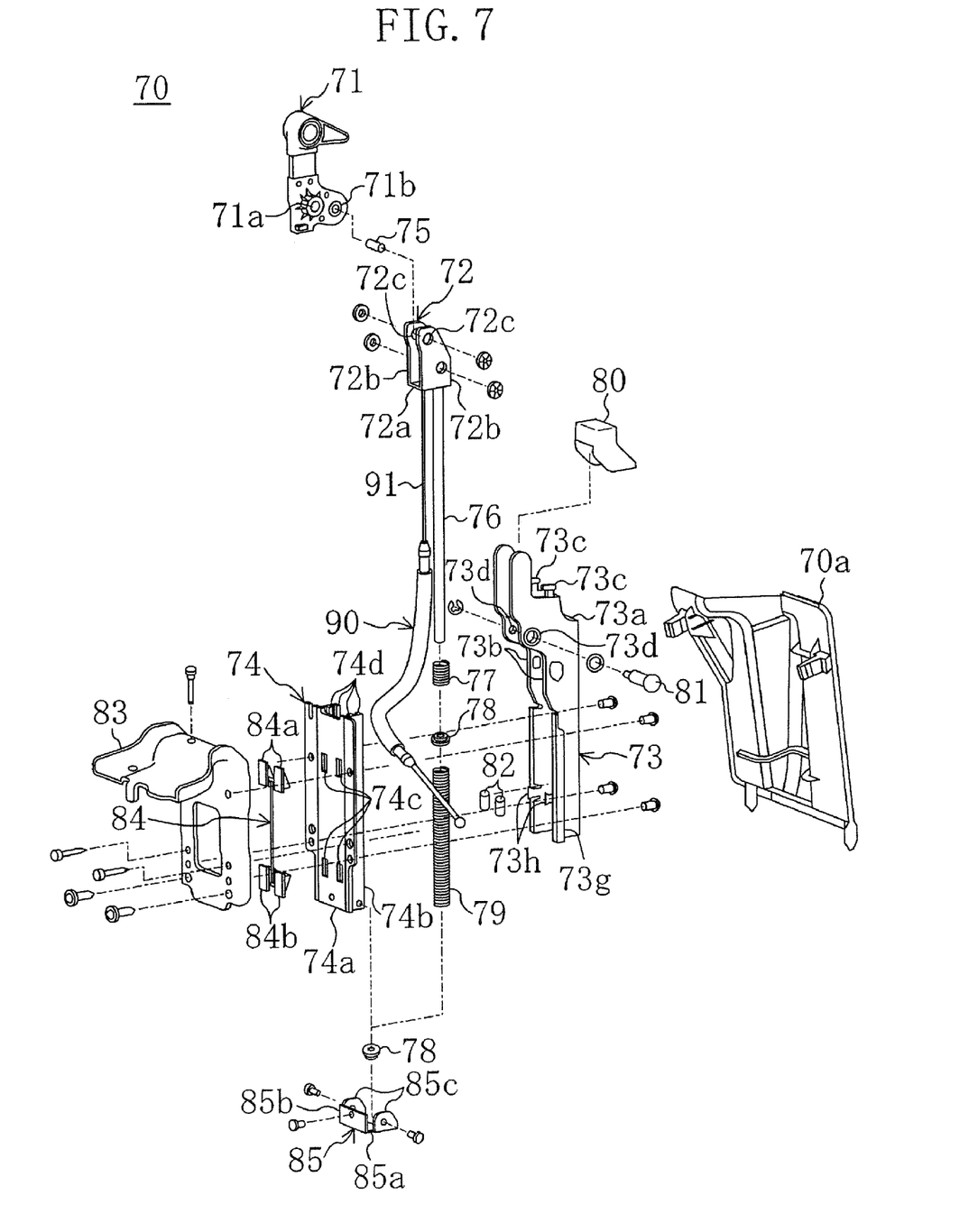
FIG. 7 is an exploded perspective view of a roof locking mechanism.
Figure 8:
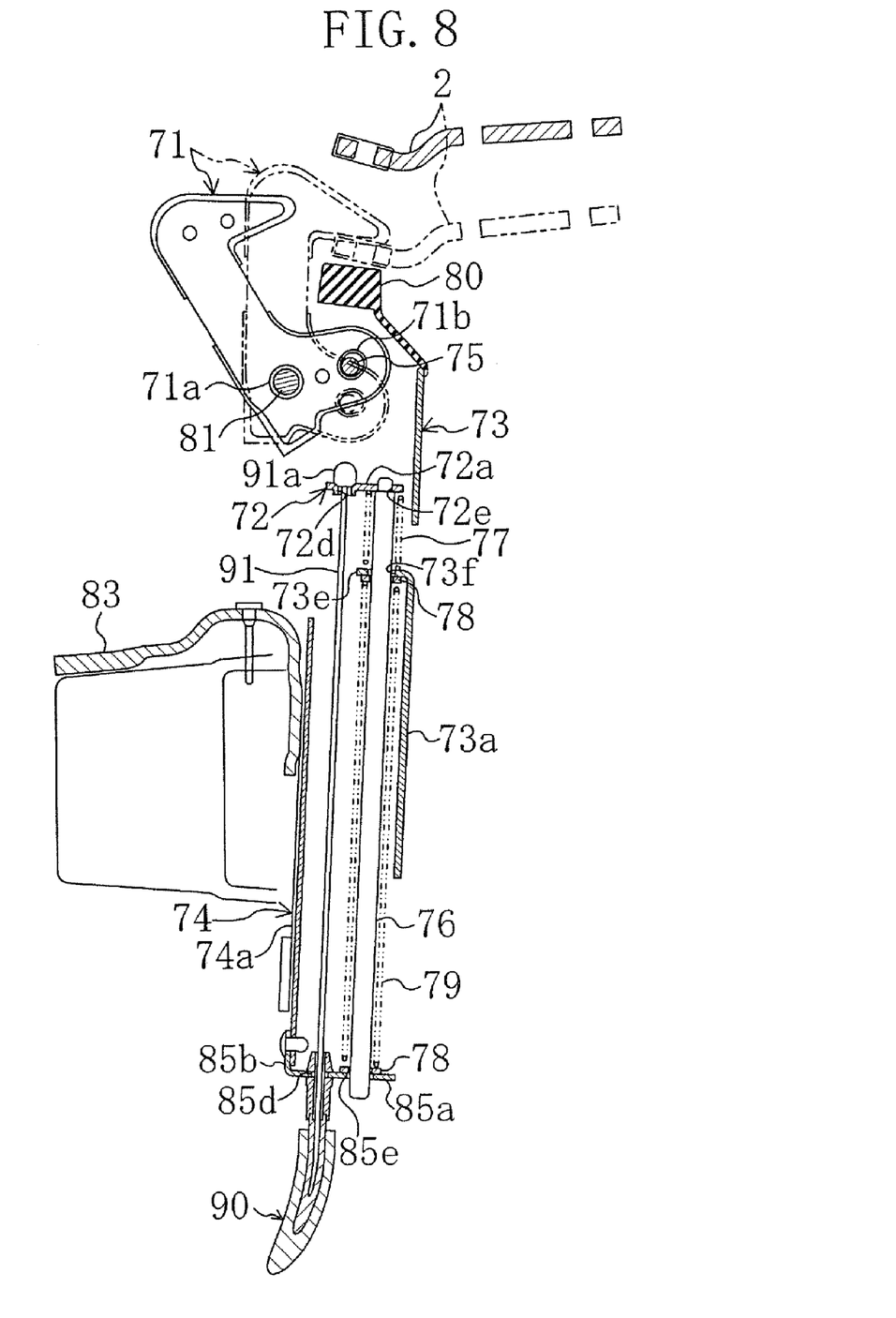
FIG. 8 is a cross sectional view of a roof locking mechanism with a hook in a grip-disengaging mode.
Figure 9:
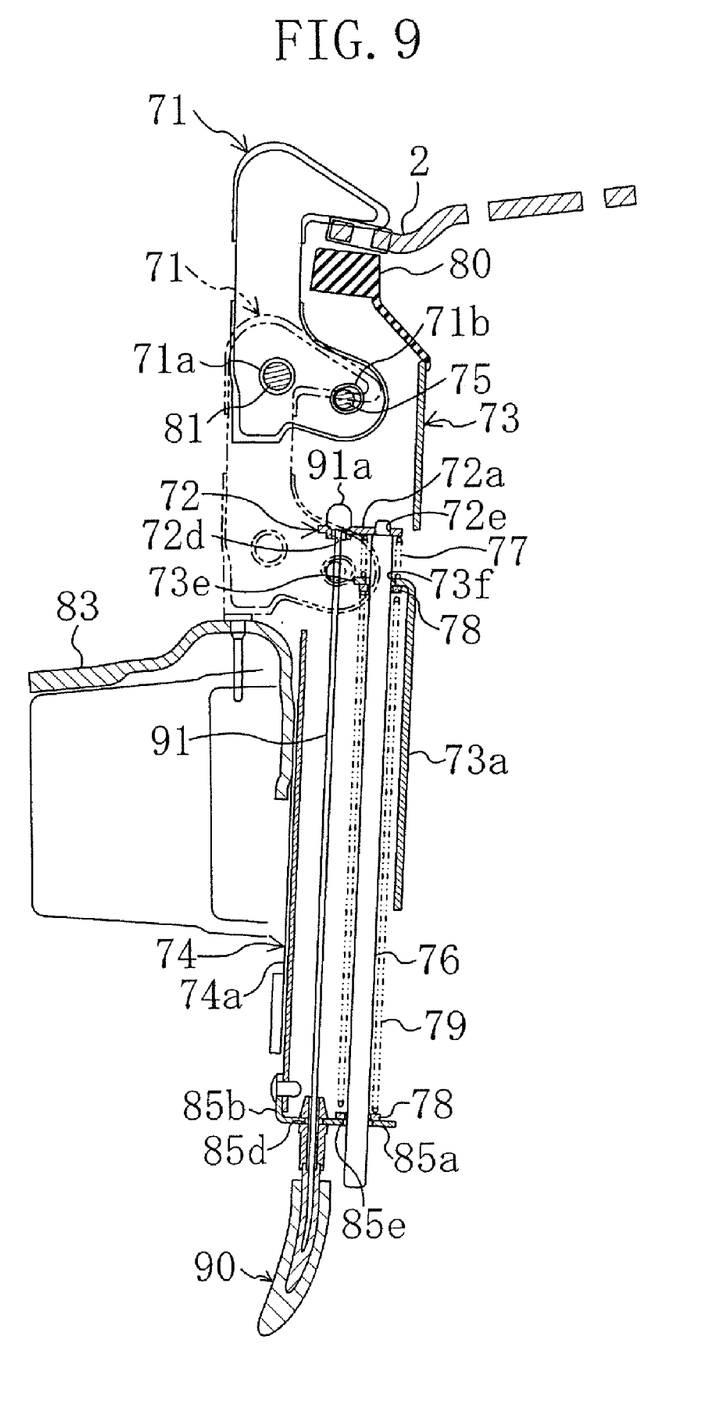
FIG. 9 is a cross sectional view of a roof locking mechanism when a grip member is in a gripping position.
Figure 10:
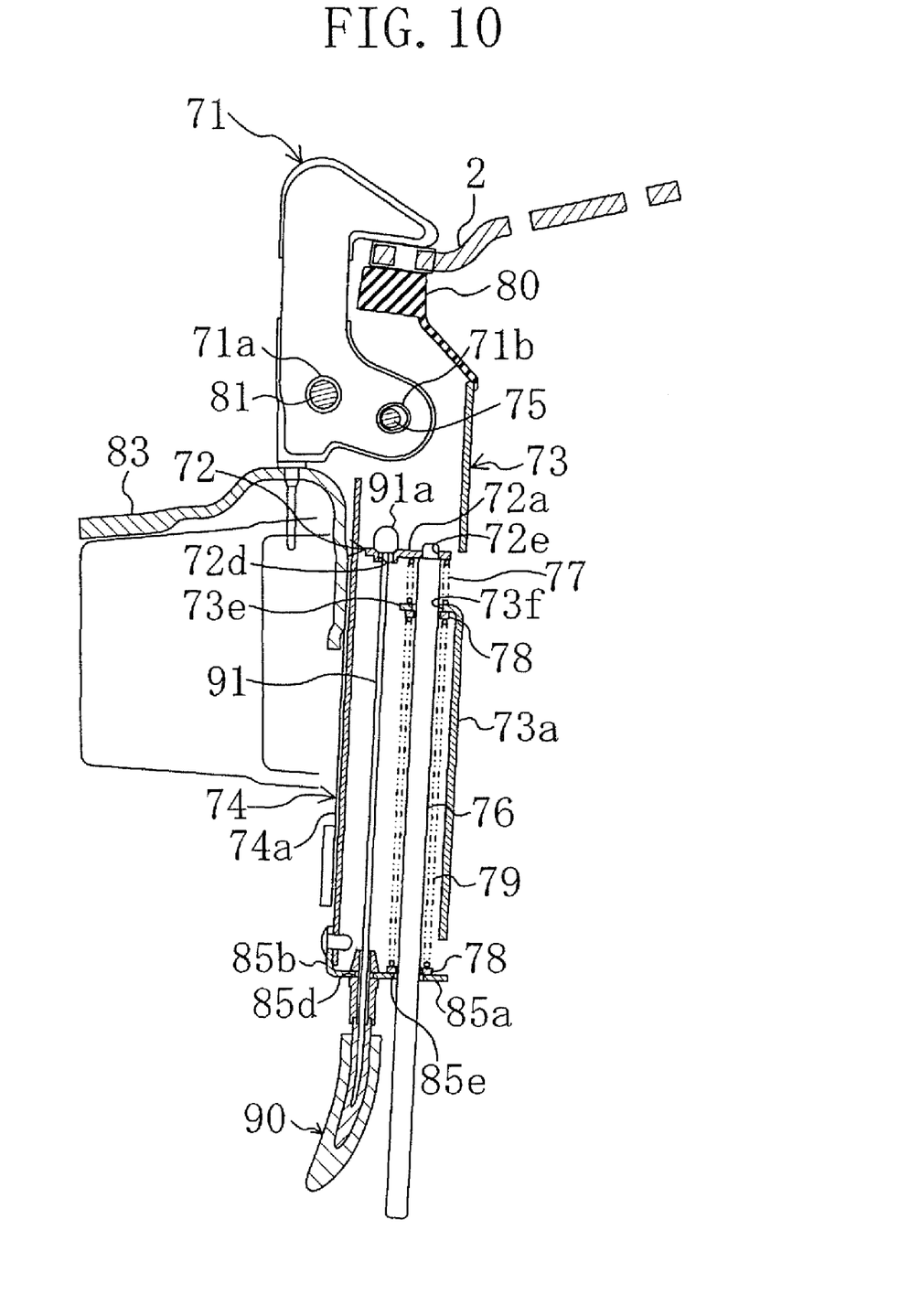
FIG. 10 is a cross sectional view of a roof locking mechanism when a grip member is in a retracted position.

FIG. 1 and FIG. 2 are schematic side elevational views showing a road vehicle (passenger vehicle) 1 including a retractable roof 5. FIG. 3 is a side elevational view of a link mechanism 10 and a roof locking apparatus 70. FIG. 4 is an exploded perspective view of a link mechanism 10. FIG. 5 is a perspective view of a link mechanism 10 with a lid (tonneau cover) 6 closed when the link mechanism 10 is viewed from a right rear direction. FIG. 6 is a perspective view of a link mechanism 10 with a lid 6 opened when the link mechanism 10 is viewed from a right rear direction. FIG. 7 is an exploded perspective view of a roof locking mechanism. FIG. 8 is a cross sectional view of a roof locking mechanism with a hook 71 in a grip-disengaging mode. FIG. 9 is a cross sectional view of the roof locking mechanism when a grip member is in a gripping position. FIG. 10 is a cross sectional view of a roof locking mechanism when a grip member is in a retracted position.

—Configuration of a Retractable Roof—

As shown in FIG. 1 and FIG. 2, the retractable roof 5 includes a front roof 2 that constitutes a ceiling of a passenger compartment, and a back roof 3 and a rear window 4 on the rear side. In a fully open state as shown in FIG. 2, the front roof 2, the back roof 3, and the rear window 4 are folded and retracted in a storage space 7, the storage space being located in the vehicle in front of a trunk space at the tail of the vehicle 1. FIG. 1 shows the retractable roof 5 in fully closed state in solid line, and that in semi-opened state in dashed line. Then, when the retractable roof is in fully open state or fully closed state, the storage space 7 is shielded by a lid 6. The retractable roof 5 is opened and closed by a link mechanism, and the lid 6 is opened and closed by the link mechanism 10. The front roof 2 of the retractable roof 5 in the storage space 7 is held by a roof locking apparatus 70. However, as figures become complicated and not easy to see, the link mechanism for opening and closing the retractable roof 5, the link mechanism 10, and the roof locking apparatus 70 are not shown in FIG. 1 and FIG. 2.

—Configuration of a Link Mechanism—

As shown in FIG. 3 to FIG. 6, the link mechanism 10 that can shift the lid 6 between an open position (refer to a two-dot chain line in FIG. 3) and a closed position (refer to a solid line in FIG. 3) is a mechanism for opening and closing the lid 6 with a motor 12 as a driving source, the link mechanism having a main bracket 21 as a base, a lid bracket 31 secured to the lid 6, a drive lever 14 both ends of which are pivotally connected to the main bracket 21 and the lid bracket 31 and that actuates the link mechanism 10, and a driven lever 15 both ends of which are pivotally connected to the main bracket 21 and the lid bracket 31 and that restricts opening/closing range and opening/closing action of the lid 6. The main bracket 21 is fixed to the base of the storage space 7 to be fixed to the vehicle body. In addition, as the figures become complicated and not easy to see, the driven lever 15 is not shown in FIG. 5 and FIG. 6.

The drive lever 14 is driven by a sector gear 13. The sector gear 13 is rotatably attached by a sector gear mounting bolt 41 to the main bracket 21 as the base and driven by the motor 12 through a pinion (not shown). The motor 12 is secured to a motor bracket 11 that is attached by two bolts 42, 43 to the main bracket 21. Of these bolts 42, 43, the bolt 42 is inserted into an opening 45 opened in the motor bracket 11 and the bolt 43 is inserted into a long hole 46 opened in the motor bracket 11. Either of the bolts sandwiches a washer 51 between the motor bracket 11 and the bolt and is threaded into an opening with a female screw opened on the main bracket 21. In the main bracket 21 is provided a bend part 52 that is bent from a plane to which the motor bracket 11 is attached and vertically extends to the plane, the main bracket being secured to the motor bracket 11 by inserting an emergency bolt 44 into a mounting hole 53 opened in the bent part.

When the lid 6 is closed, a hook unit 23 provided in the sector gear 13 locks the lid 6 so that it does not open, by engaging with a hook engaging pin 32 provided on a lid bracket 31 that is fixed to the lid 6.

As shown in FIG. 4 to FIG. 6, a wire guiding 61 is fixed to the right side of the lower end of the drive lever 14. The wire guiding 61 is in the form of a plate and formed almost like a semicircle when viewed from the side of the vehicle. A central shaft of the wire guiding 61 matches a revolving shaft of the lower end of the drive lever 14. In an outer periphery of the right side of the wire guiding 61 is formed a channel 61a that opens toward a radially outer side. An inner wire 91 of a push-pull cable 90, to be described later, is hung around the channel 61a with a back end of the inner wire 91 fixed to the wire guiding 61.

A holder 62 is welded and fixed to the main bracket 21 so as to cover the channel 61a of the wire guiding 61. The holder 62 is intended to prevent the inner wire 91 of the push-pull cable 90 from slipping from the channel 61a of the wire guiding 61.

—Configuration of a Roof Locking Apparatus—
As shown in FIG. 3 and FIG. 7 to FIG. 10, the roof locking apparatus 70 is intended to hold a middle portion with respect to a vehicle width direction of a front edge of the front roof 2 within the storage space 7. The roof locking apparatus 70 is adapted to work with the link mechanism 10. The roof locking apparatus 70 includes a hook 71, an internal slider 72, a slider 73, a rail 74, and the push-pull cable 90. The hook 71, the internal slider 72 and the slider 73 constitute a grip member that grips the middle portion with respect to the vehicle width direction of the front edge of the front roof 2 of the retractable roof 5 as it is being stored into the storage space 7. The grip member and the rail 74 constitute a roof locking mechanism for holding the middle portion with respect to the vehicle width direction of the front edge of the front roof 2 within the storage space 7. The roof locking mechanism, covered by a trim 70a from the rear side of the vehicle, is fixed to a region opposed to the middle portion with respect to the vehicle width direction of the front edge of the front roof 2 within the storage space 7, in the vehicle body. The rail 74, the push-pull cable 90, and said link mechanism 10 constitute a moving mechanism that moves the grip member in the up-down direction between a gripping position where the grip member grips the front roof 2 (refer to a two-dot chain line in FIG. 8 and a solid line in FIG. 9) and a retracted position (corresponding to a holding position. Refer to a two-dot chain line in FIG. 9 and see FIG. 10) provided below the gripping position by a predetermined distance (50 mm, for example) therefrom where the grip member gripping the front roof 2 is held. In addition, the front-rear direction of the roof locking apparatus 70 matches the front-rear direction of the vehicle and its right-left direction matches the vehicle width direction. In FIG. 3, as the figure becomes complicated and not easy to see, diagrammatic representation of the retractable roof 5 is omitted.

Said hook 71 is adapted to be able to shift between a gripping mode (refer to the two-dot chain line in FIG. 8 and the solid line in FIG. 9) for gripping the front roof 2 between a cushion rubber 80 of the slider 73 and the hook and a grip-disengaging mode (refer to a solid line in FIG. 8) for releasing the front roof 2, by rotating the hook in a positive or inverse direction around a central shaft of a shaft 81 to be described later. In the grip-disengaging mode, the hook 71 is tilted to the front of the vehicle. The hook 71 is formed almost like a letter C when viewed from the side of the vehicle. On the front side and back side of the lower part of the hook 71 are formed a circular shaft insertion hole 71a and a pin insertion hole 71b shaped like a long hole, respectively, so as to extend to the vehicle width direction.

Said internal slider 72 is provided between upper parts of the right and left side plates 73b, 73b of the slider 73. The internal slider 72 has a bottom plate 72a and right and left side plates 72b, 72b, respectively extending upward from the right and left edges of the bottom plate 72a. In the upper ends of respective side plates 72b are formed circular pin insertion holes 72c so that they are opposed to each other. Between the side plates 72b and 72b is arranged the hook 71 so that its pin insertion hole 71b corresponds to the pin insertion hole 72c of each side plate 72b. A pin 75 extending to the vehicle width direction is inserted into and supported by the pin insertion hole 72c of each side plate 72b and the pin insertion hole 71b of the hook 71. As such, the hook 71 is rotatably supported around the central shaft of the pin 75 between the side plates 72b and 72b of the internal slider 72. On the front side and back side of the bottom plate 72a are formed a circular wire clamping hole 72d and a circular rod insertion hole 72e, respectively. The upper end of the inner wire 91 of the push-pull cable 90 is clamped to a wire camp hole 72d. To be specific, by attaching a clamp 91a to an upper end of the inner wire 91 with the upper end inserted through the wire clamp hole 72d, the upper end of the inner wire 91 is clamped to the wire clamp hole 72d. An upper end of a rod 76 is inserted into and fixed to a rod insertion hole 72e.

The rod 76 is columnar and extends in the up-down direction. A secondary spring 77, a bushing 78, a main spring 79, and a bushing 78 are externally fitted over the rod 76 in this order from the top. The secondary spring 77 is intended to shift the hook 71 between the gripping mode and the grip-disengaging mode. The main spring 79 is intended to move the grip member in the up-down direction between the gripping position and the retracted position. The main spring 79 is made longer than the secondary spring 77. Elastic property of the main spring 79 differs from that of the secondary spring 77. To be specific, a spring constant of the main spring 79 is set higher than that of the secondary spring 77 so that the grip member is not moved below the gripping position against an elastic force of the main spring 79 along the rail 74 before the grip member grips the front roof 2 against an elastic force of the secondary spring 77 in the gripping position.

Said slider 73 formed like a letter C on the cross section, and has a bottom plate 73a and right and left side plates 73b, 73b, respectively, extending to the front of the vehicle from right and left edges of the bottom plate 73a. Length of each side plate 73b in the front-rear direction of the vehicle increases as it goes upward. On an upper end of each side plate 73 is arranged a protrusion 73c that protrudes upward. A cushion rubber 80 is fixed to protrusions 73c, 73c with the protrusions 73c respectively inserted into the two insertion holes (not shown) of the cushion rubber 80. The cushion rubber 80 is intended to restrict behavior of a top lock cover (not shown) of the front roof 2 to prevent the front roof 2 from bowing. The cushion rubber 80 covers the slider 73 from the upper side thereof. A rear face of the cushion rubber 80 is formed so that it tilts to the rear of the vehicle as it goes down.

On the front side of the upper part of each side plate 73b of the slider 73 is formed circular shaft insertion holes 73d so as to be opposed to each other. Between the side plates 73b and 73b is arranged the internal slider 72 to which the hook 71 is rotatably attached so that the shaft insertion hole 71a of the hook 71 corresponds to the shaft insertion hole 73d of each side plate 73b. A shaft 81 extending to the vehicle width direction is inserted into and supported by the shaft insertion hole 73d of each side plate 73b and the shaft insertion hole 71a of the hook 71. As such, the hook 71 is rotatably supported around the central shaft of the shaft 81 between the side plates 73b and 73b of the slider 73.

On an inner surface in the upper part of the slider 73 is arranged an intermediate plate 73e so as to extend to the horizontal direction. A circular rod insertion hole 73f is formed on the intermediate plate 73e. The rod 76 is inserted into the rod insertion hole 73f so as to be movable in the up-down direction. Then, the secondary spring 77 is arranged between the upper surface of the intermediate plate 73e and the lower surface of the bottom plate 72a of the internal slider 72. The bushing 78, the main spring 79, and the bushing 78 are arranged in this order from top, between the lower surface of the intermediate plate 73e and upper surface of a bottom plate 85a of a bottom member 85.

On the front side of the lower part of each side plate 73b of the slider 73 is arranged a protruding linear part 73g that protrudes outward in the vehicle width direction. On the front edge of the lower part of each side plate 73b is arranged a protrusion 73h that protrudes to the front of the vehicle. A cushion stopper 82 is fixed to each protrusion 73h so as to cover the protrusion 73h. The cushion stopper 82 is intended to restrict positioning of the slider 73 of the grip member between the gripping position and the retracted position.

Said rail 74 is adapted to allow the slider 73 of the grip member to move in the up-down direction between the gripping position and the retracted position. The rail 74 is fixedly screwed to a hook bracket 83. The hook bracket 83 is fixed to a region opposed to the middle portion with respect to the vehicle width direction of the front edge of the front roof 2 within the storage space 7 and formed like letter L when viewed from the side of the vehicle. In other words, the rail 74 is attached to the region opposed to the middle part with respect to the vehicle width direction of the front edge of the front roof 2 via the hook bracket 83 within the storage space 7, in the vehicle body. The rail 74 is formed almost like letter C on the cross section, and has a bottom plate 74a and right and left side plates 74b, 74b respectively extending to the rear of the vehicle from right and left edges of the bottom plate 74a. In the upper part and the lower part of the bottom plate 74a are two almost rectangular stopper insertion holes 74c, 74c spaced to each other by a predetermined spacing with respect to the vehicle width direction. A stopper 84 is inserted and fixed to the stopper insertion hole 74c.

The stopper 84 is intended to restrict positioning of the slider 73 of the grip member between the gripping position and the retracted position. The stopper 84 has two upper stoppers 84a, 84a and two lower stoppers 84b, 84b. Respective upper and lower stoppers 84a, 84b are formed almost like a triangle when viewed from the side of the vehicle. The rear face of each upper stopper 84a is formed to tilt to the rear of the vehicle as it goes down and the rear face of each lower stopper 84b is formed to tilt to the rear of the vehicle as it goes up. In addition, if a position on the lower surface of each upper stopper 84a or on the upper surface of each lower stopper 84b is changed, the gripping position or the retracted position is changed. In other words, if a distance between the lower surface of each upper stopper 84a and the upper surface of each lower stopper 84b is changed, a predetermined distance between the gripping position and the retracted position is changed.

On an inner surface of each side plate 74b of the rail 74 is arranged a pair of rail plates 74d, 74d that protrude inward in the vehicle width direction and are spaced to each other at regular interval. Each protruding linear part 73g of the slider 73 is fitted movably in the up-down direction between the side plates 74d and 74d.

To the lower end of the rail 74 is fixed a bottom member 85 so that it covers the lower end of the rail 74 from its underside. The bottom member 85 has a bottom plate 85a and a front side plate 85b and the right and left side plates 85c, 85c extending upward from the front edge of the bottom plate 85a and the right and left edges, respectively. On the front side and back side of the bottom plate 85a are formed a circular wire insertion hole 85d and a circular rod insertion hole 85e, respectively. The inner wire 91 of the push-pull cable 90 is inserted movably in the up-down direction into the wire insertion hole 85d. The rod 76 is inserted movably in the up-down direction into the rod insertion hole 85e. The front side plate 85b and the right and left side plates 85c, 85c are riveted to the bottom plate 74a and the right and left side plates 74b, 74b of the rail 74, respectively.

Said push-pull cable 90 is intended to transmit a driving force (operating force) of the link mechanism 10 to a roof locking mechanism, thereby causing a holding operation of the front roof 2 in the storage space 7 and a releasing operation thereof. As described above, the push-pull cable 90 has one end attached to the internal slider 72 of the grip member and the other end attached to the wire guiding 61 of the link mechanism 10.

—Operation of a Roof Locking Apparatus—

Operation of the roof locking apparatus 70 will hereinafter be described in detail with reference to FIG. 5, FIG. 6, and FIG. 8 to FIG. 10.

First, operation of the roof locking apparatus 70 when the retractable roof 5 is retracted into the storage space 7 will hereinafter be described. In the following, operation of the roof locking apparatus 70 after the retractable roof 5 has changed from fully closed state to semi-open state, that is, the operation of the roof locking apparatus 70 after the lid 6 changes from closed state to open state is described (refer to FIG. 1). Now when the lid 6 is in open state, the link mechanism 10 is in the condition as shown in FIG. 6, and a roof locking mechanism is in the condition as shown in a solid line in FIG. 8.

When the link mechanism 10 starts a position changing operation from the open position to the closed position of the lid 6, the drive lever 14 of the link mechanism 10 rotates clockwise in a positive direction centering around a revolving shaft of a lower end thereof, as shown in FIG. 6. Accordingly, the wire guiding 61 of the link mechanism 10 also rotates clockwise in a positive direction centering around the central axis, as shown in FIG. 6. Consequently, the inner wire 91 of the push-pull cable 90 is pulled to the side of the wire guiding 61 as it is wound up by the wire guiding 61 of the link mechanism 10. Accordingly, the internal slider 72 is pulled down by the inner wire 91 and moved down against an elastic force of the secondary spring 77. Then, the rear side of the lower part of the hook 71 is pulled down by the internal slider 72 and the hook 71 rotates clockwise in the positive direction centering around the central shaft of the shaft 81, as shown in FIG. 8. Accordingly, the hook 71 is shifted from the grip-disengaging mode to the gripping mode and the grip member grips the front roof 2 in the gripping position. As described above, the holding operation of the front roof 2 by the roof locking mechanism in the storage space 7 is started, almost simultaneously with changing of the lid 6 from the closed position to the open position by the link mechanism 10 is started (same period).

Then, the grip member gripping the front roof 2 is pulled down by the inner wire 91 against an elastic force of the main spring 79 and slidingly moved down along the rail 74. When the grip member gripping the front roof 2 slidingly moves to the retracted position, the cushion stopper 82 of the slider 73 of the grip member abuts on the upper surface of the lower stopper 84b of the rail 74. Accordingly, the grip member gripping the front roof 2 is stopped by the stopper 84 and held in the retracted position. Then, almost simultaneously (same period) with end of the position changing operation of the lid 6 by the link mechanism 10 to the closed position, the holding operation of the front roof 2 by the roof locking mechanism in the retracted space 7 ends. Now, if the lid 6 is in closed state, the link mechanism 10 is in the state as shown in FIG. 5 and the roof locking mechanism is in the state as shown in FIG. 10.

Operation of the roof locking apparatus 70 when the retractable roof 5 retracted in the storage space 7 is gotten out of the storage space 7 will hereinafter be described.

When the link mechanism 10 starts a position changing operation of the lid 6 from a closed position to an open position, the drive lever 14 of the link mechanism 10 rotates anticlockwise, as shown in FIG. 5, in an inverse direction centering around a revolving shaft of the lower end. With this, the wire guiding 61 of the link mechanism 10 also rotates anticlockwise, as shown in FIG. 5, in the inverse direction centering around the central shaft. Consequently, the inner wire 91 of the push-pull cable 90 is pushed out, or loosened, to the opposite side of the wire guiding 61 by the wire guiding 61 of the link mechanism 10. Then, the grip member gripping the front roof 2 is pushed up by an elastic force from the main spring 79 and slidingly moved upward along the rail 74. As described above, almost simultaneously (same period) with starting of the position changing operation of the lid 6 to the open position by the link mechanism 10, the operation of releasing the held condition of the front roof 2 in the storage position 7 by the roof locking mechanism is started.

Then, when the grip member gripping the front roof 2 slidingly moves to the gripping position, the cushion stopper 82 of the slider 73 of the grip member abuts on the lower surface of the upper stopper 84a of the rail 74. Consequently, the slider 73 of the grip member gripping the front roof 2 is stopped by the stopper 84 and held in the gripping position.

Then, the internal slider 72 is pushed up by an elastic force of the secondary spring 77 and moved upward. Then, the rear side of the lower part of the hook 71 is pushed up by the internal slider 72, and the hook 71 rotates anticlockwise, as shown in FIG. 8, in the inverse direction centering around the central shaft of the shaft 81. Consequently, the hook 71 is changed from the gripping mode to the grip-disengaging mode and the front roof 2 is released from the gripped condition by the grip member in the gripping position. Then, almost simultaneously (same period) with end of the position changing operation of the lid 6 to the open position by the link mechanism 10, the operation of releasing held condition of the front roof 2 in the storage space 7 by the roof locking mechanism ends.

—Effect—

With the above, according to the embodiment, as the roof locking apparatus 70 holds a middle portion with respect to a vehicle width direction of a front edge of a front roof 2 within a storage space 7, the number of members of the apparatus 70 can be reduced, when compared with the case in which it holds both ends with respect to a vehicle width direction of a front edge of a front roof 2 within the storage space 7.

In addition, as the roof locking apparatus 70 holds the middle portion with respect to the vehicle width direction of the front edge of the front roof 2 within the storage space 7, it can prevent the front roof 2 from oscillating in the storage space 7.

To get a retractable roof 5 retracted in a storage space 7 out of the storage space 7, there is a possibility that simply by releasing held condition of a front edge of the front roof 2, the front roof 2 might tilt forward and move, or bow, due to weight or gravity center of the front roof 2 after the release. Then, the bowing may cause the front roof 2 to oscillate during movement thereof and be damaged.

Now, according to the embodiment, to get the retractable roof 5 retracted in the storage space 7 out of the storage space 7, after the moving mechanism moves the grip member gripping the front edge of the front roof 2 from a retracted position to the gripping position defined above the holding position by a predetermined distance away therefrom, the front edge of the front roof 2 is released from the gripped condition by the grip member in the gripping position. In other words, before the gripped condition of the front edge of the front roof 2 is released, the front edge of the front roof 2 is raised. Thus, when the retractable roof 5 retracted in the storage space 7 is gotten out of the storage space 7, the front roof 2 of the retractable roof 5 can be prevented from bowing. Accordingly, when the retractable roof 5 retracted in the storage space 7 is gotten out of the storage space 7, the front roof 2 can be prevented from oscillating during movement thereof and or being damaged.

In addition, as the rail 74 is provided, in a vehicle body, in a region opposed to the middle portion with respect to the vehicle width direction of the front edge of the front roof 2 within the storage space 7, the grip member can reliably hold the middle portion with respect to the vehicle width direction of the front edge of the front roof 2 within the storage space 7. Thus, the front roof 2 can be prevented from oscillating within the storage space 7.

Other Embodiments

Figure 11:
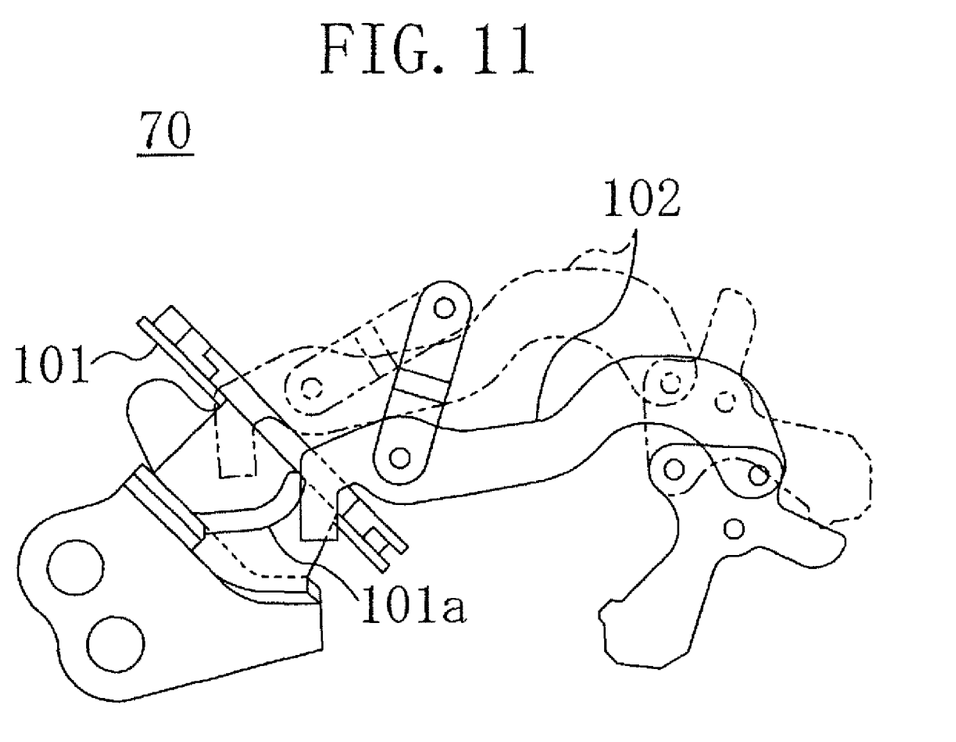
FIG. 11 is a variation of a roof locking apparatus.

In the above embodiments, a description was given on holding a middle portion with respect to the vehicle width direction of a front edge of the front roof 2 within the storage space 7. However, the roof locking apparatus 70 may alternatively hold a middle portion with respect to a vehicle width direction of one edge of a movable roof in a front-rear direction in a predetermined space other than the storage space 7, such as a middle portion with respect to a vehicle width direction of a front edge of a movable roof retracted in a trunk space or a middle portion with respect to a vehicle width direction of a front edge of a movable roof in fully closed state, for example. In such a case, the roof locking apparatus 70 may be anything. For example, in FIG. 11, a lock plate 101 is provided in a vehicle body, in a region opposed to a middle portion with a respect to a vehicle width direction of one edge of a movable roof in a vehicle front-rear direction in the predetermined space, and a hook 102 is provided at the middle portion with respect to the vehicle width direction of the one edge of the movable roof in the vehicle front-rear direction, thereby holding the middle portion with respect to the vehicle width direction of the one edge of the mobile roof in the vehicle front-rear direction in the predetermined space. FIG. 11 shows in solid line the roof in holding mode where a hook 102 is engaged with a locking unit 101a of the lock plate 101, and in two-dot chain line the mode in which the engagement is released.

In addition, in the above embodiments, although the roof locking apparatus 70 holds the middle portion with respect to the vehicle width direction of the front edge of the front roof 2 within the storage space 7, it may alternatively hold a middle portion with respect to a vehicle width direction of a front edge of any roof other than the front roof 2.

In addition, in the above embodiments, although the grip member is constituted with the hook 71, the internal slider 72, and the slider 73, the grip member may be anything as far as it can grip the middle portion with respect to the vehicle width direction of the front edge of the front roof 2 during the front roof being retracted into the storage space 7.

In addition, in the above embodiments, although the moving mechanism is constituted with the rail 74, the push-pull cable 90, and the link mechanism 10, the moving mechanism may be anything as far as it can move the grip member between the gripping position and the retracted position in the up-down direction.

In addition, in the above embodiments, to retract the retractable roof 5 in the storage space 7, after the grip member grips the front roof 2 in the gripping position, the moving mechanism moves the grip member gripping front roof 2 from the gripping position to the retracted position where the grip member gripping the front roof 2 is held, while, on the other hand, to get the retractable roof 5 retracted in the storage space 7 out of the storage space 7, after the moving mechanism moves the grip member gripping the front roof 2 from the retracted position to the gripping position where the front roof 2 is released from the gripped condition by the grip member, but the moving mechanism, unlike the above, needs not necessarily move the front roof 2 in the up-down direction to retract the retractable roof 5 or get the retracted retractable roof 5 out. However, it is desirable to move the front roof 2 in the up-down direction to prevent the front roof 2 from bowing.

In addition, in the above embodiment, although the rail 74 is provided in the vehicle body, in the region opposed to the middle portion with respect to the vehicle width direction of the front edge of the front roof 2 within the storage space 7, the rail 74 may be provided anywhere else in the vehicle body as far as it can hold the middle portion with respect to the vehicle width direction of the front edge of the front roof 2 within the storage space 7.

The present invention is not limited to the embodiments and may be carried out in other various forms without departing from the sprit or major characteristics.

As such, the above embodiments are simply illustrative in every point, and should not be interpreted in a limited way. The scope of the present invention is illustrated by the Claims, and by no means bound by the text of the application. In addition, variations or modifications belonging to equal scope of the Claims are all within the scope of the present invention.

INDUSTRIAL APPLICABILITY

As described hereinbefore, a roof locking apparatus according to the present invention can be applied to such intended use as reduction in the number of members.

The invention claimed is:

1. A roof locking apparatus for a retractable roof of a vehicle, the retractable roof being storable within a storage space, wherein said roof locking apparatus is configured to hold a middle portion with respect to a vehicle width direction of one edge of the retractable roof in the front-rear direction within the storage space, wherein the one edge of the roof is a front edge of the roof, the roof locking apparatus comprising;
    a grip member to grip the middle portion with respect to the vehicle width direction of the front edge of the roof during the roof being retracted into the storage space; and
    a moving mechanism to move said grip member in the up-down direction between a gripping position, where said grip member grips the roof, and a holding position provided at a lower location relative to said gripping position by a predetermined distance therefrom where said grip member gripping the roof is held,
    wherein to retract the roof into the storage space, after said grip member grips the roof in said gripping position, said moving mechanism moves the grip member gripping the roof from said gripping position to said holding position, where said grip member gripping the roof is held while on the other hand to get the roof retracted in the storage space out of the storage space, after said moving mechanism moves said grip member gripping the roof from said holding position to said gripping position, where the roof is then released from the gripped condition by said grip member.

2. The roof locking apparatus for a vehicle according to claim 1, wherein said retractable roof has a front roof, a rear roof, and a rear window;
    and said roof locking apparatus being positioned to hold the middle portion with respect to the vehicle width direction of the front edge of the front roof within the storage space.

3. The roof locking apparatus for a vehicle according to claim 1, wherein said moving mechanism has a rail provided in the vehicle body in a region opposed to the middle portion with respect to the vehicle width direction of the front edge of the roof within the storage space, wherein the moving mechanism is configured to cooperate with said grip member to move in the up-down direction between the gripping position and the retracted position.

* * * * *